US007028188B1

(12) United States Patent
Moore

(10) Patent No.: US 7,028,188 B1
(45) Date of Patent: Apr. 11, 2006

(54) DOCUMENT AUTHENTICATION USING THE PHYSICAL CHARACTERISTICS OF UNDERLYING PHYSICAL MEDIA

(75) Inventor: Keith E. Moore, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 998 days.

(21) Appl. No.: 09/702,183

(22) Filed: Oct. 30, 2000

(51) Int. Cl.
*H04L 9/00* (2006.01)

(52) U.S. Cl. .......................... 713/176; 713/200; 380/59

(58) Field of Classification Search ................. 713/200, 713/201, 186, 180, 174, 178, 185, 176, 193; 380/59; 356/71; 235/375, 380; 382/100; 359/2; 162/140
See application file for complete search history.

(56) References Cited

U.S. PATENT DOCUMENTS

| | | | | |
|---|---|---|---|---|
| 5,089,712 A | | 2/1992 | Holland | |
| 5,128,779 A | * | 7/1992 | Mallik | 359/2 |
| 5,157,726 A | * | 10/1992 | Merkle et al. | 713/176 |
| 5,325,167 A | * | 6/1994 | Melen | 356/71 |
| 5,576,825 A | | 11/1996 | Nakajima et al. | |
| 5,621,200 A | * | 4/1997 | Irwin et al. | 235/375 |
| 5,647,003 A | * | 7/1997 | Pease | 380/59 |
| 5,719,939 A | | 2/1998 | Tel | |
| 5,768,426 A | | 6/1998 | Rhoads | |
| 5,871,615 A | * | 2/1999 | Harris | 162/140 |
| 5,903,340 A | * | 5/1999 | Lawandy et al. | 356/71 |
| 6,170,744 B1 | * | 1/2001 | Lee et al. | 235/380 |
| 6,539,475 B1 | * | 3/2003 | Cox et al. | 713/100 |
| 6,567,530 B1 | * | 5/2003 | Keronen et al. | 382/100 |

FOREIGN PATENT DOCUMENTS

| | | |
|---|---|---|
| FR | 2765014 A1 | 6/1997 |
| FR | 2765014 A1 | 12/1998 |
| WO | WO 99/08230 | 2/1999 |
| WO | WO 00/46742 | 8/2000 |

OTHER PUBLICATIONS

Copy of European Patent Office Search Report dated May 28, 2003 showing the relevant passages of the above referenced French Patent.

* cited by examiner

*Primary Examiner*—Ly V. Hua

(57) ABSTRACT

A method for authenticating a document in which a document key for the document is generated by examining one or more attributes of a physical media that underlies the document. An original image is then imparted onto the physical media so that the original image is associated with the document key in a way that enables a subsequent recovery of the document key from the original image. This tying together of the underlying physical media, through the document key, with an original image enables detection of a forgery which was performed either through an alteration of the original image, or ink stripping and re-printing, or a printing of the original image on another physical media.

35 Claims, 5 Drawing Sheets

DOCUMENT AUTHENTICATION USING THE PHYSICAL CHARACTERISTICS OF UNDERLYING PHYSICAL MEDIA

BACKGROUND OF THE INVENTION

1. Field of Invention

The present invention pertains to the field of document authentication. More particularly, this invention relates to document authentication using the physical characteristics of the underlying physical media of the document.

2. Art Background

A wide variety of documents including event tickets, paper currency, stock certificates, securities, checks, and other legal documents, etc., are commonly subject to various types of forgery. For example, such documents may be copied using color copiers. In another example, ink may be stripped off of the paper which underlies an authentic document and a new image printed on the paper, thereby enabling conversion of a low face value document to a high face value document.

In some prior methods of document authentication, a water-mark and/or other object is inserted into the paper on which a document is printed. Such methods attempt to avoid forgeries by making it difficult to reproduce the characteristics of the paper which underlies a document. Unfortunately, such methods usually cannot prevent the stripping of ink from the original paper and the printing of a new image.

SUMMARY OF THE INVENTION

A method for authenticating a document is disclosed in which a document key for the document is generated by examining one or more attributes of a physical media that underlies the document. An original image is then imparted onto the physical media so that the original image is associated with the document key in a way that enables a subsequent recovery of the document key from the original image. This tying together of the underlying physical media, through the document key, with an original image enables detection of a forgery which was performed either through an alteration of the original image, or ink stripping and re-printing, or a printing of the original image on another physical media.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
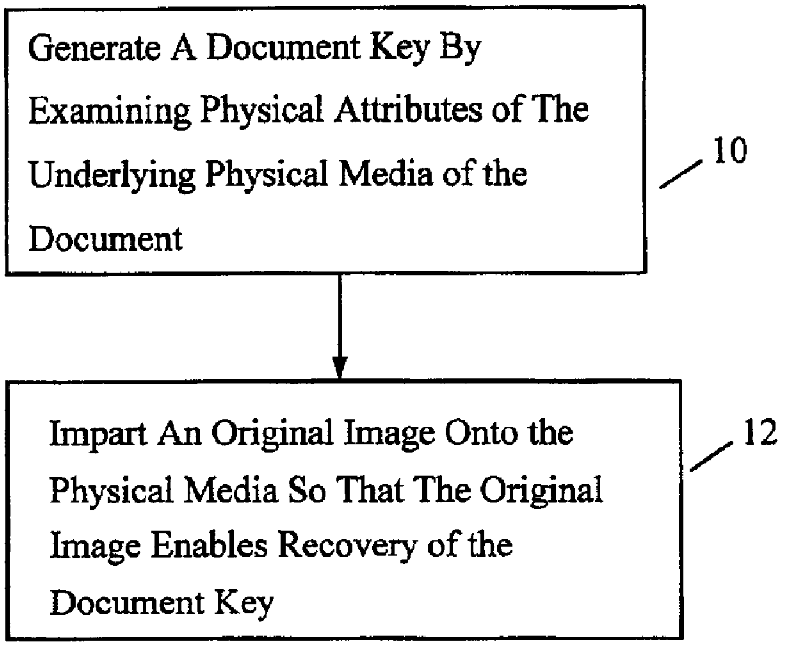
FIG. 1 shows a method for authenticating a document according to the present techniques.

FIG. 1 shows a method for authenticating a document according to the present techniques. The document authenticated may be any conceivable document including event tickets, paper currency, stock certificates, securities, checks, and other legal documents, etc., to name a few examples.

At step 10, a document key for the document is generated. The document key is based on one or more unique physical attributes associated with the physical media which underlies the document. The physical media is commonly paper media but the present teachings apply equally well to other types of underlying materials.

In some embodiments, the unique physical attributes upon which the document key is based are the random differences in the density and/or orientation of the paper fibers that were formed during the manufacture of the paper media which underlies the document. One known arrangement for determining the random differences in the density and/or orientation of paper fibers is described in U.S. Pat. No. 5,089,712. Other known mechanisms that enable detection of paper fiber characteristics may also be employed.

Alternatively, the unique physical attributes may be a unique pattern printed in the paper media such as through the use of a reflective substance or UV ink or predetermined shapes printed in predetermined positions. The predetermined positions or locations may be measured and encoded in a digital key at the time the image is created/locked. The location may be measured relative to an element of an image printed on the media.

At step 12, an original image is imparted onto the physical media that underlies the document. The original image is imparted so that the document key may be subsequently recovered from the original image. Step 12 may be performed by encoding the document key into the original image. The document key may be encoded using digital signing techniques. Alternatively, step 12 may be performed by encoding the document key (using a private key for example) and printing the encoded document key, which is a number, on the physical media that underlies the document.

Figure 2:
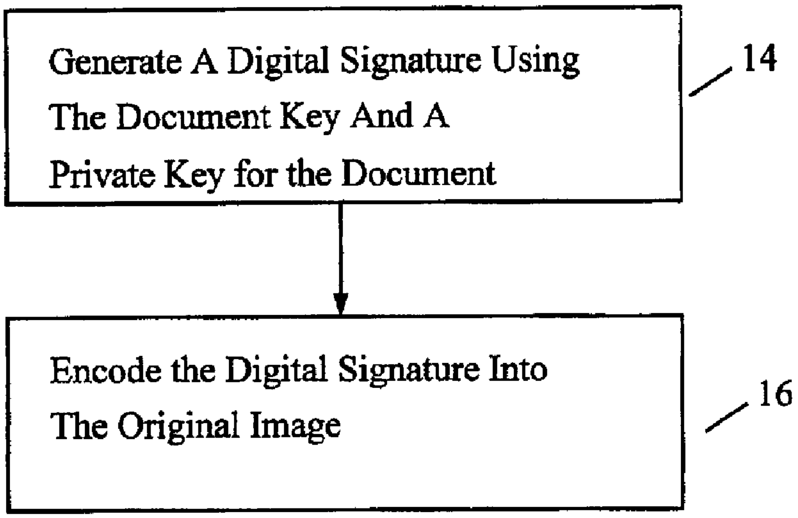
FIG. 2 shows a method for digitally signing a document to impart the document key onto the physical media of a document according to the present techniques.

FIG. 2 shows a method for digitally signing a document to impart the document key onto the physical media of a document according to the present techniques. At step 14, a digital signature for the document is generated. The digital signature is generated using the document key obtained at step 10 and a private key which is allocated to the document. The digital signature may be generated using any known digital signing technique. For example, the document key from step 10 may be used as a public key and a public-private key mechanism may be used to generate the digital signature.

At step 16, the digital signature obtained at step 14 is encoded into an original image on the document. Step 16 ties an original image on the document to the underlying physical media, via the document key, so that copying the original image to a different paper with different unique physical attributes breaks the tie.

The digital signature may be encoded in the dithering patterns of an original image which is printed on the physical media. The encoding technique may be based on an encoding matrix for a grey pattern or color pattern. Alternatively, the digital signature may be printed on the paper as a number.

In yet another alternative, the digital signature may be embedded in the paper using a digital watermark. It may be preferable that only a portion of the total image be watermarked. In this manner, a watermark is recoverable even if a portion of the document is damaged. The only portion which must not be damaged is the section wherein the document key was encoded/read such as the square in which the paper fibers are read. This level of redundancy allows the paper to be handled without invalidating the document key and the watermark.

Figure 3:
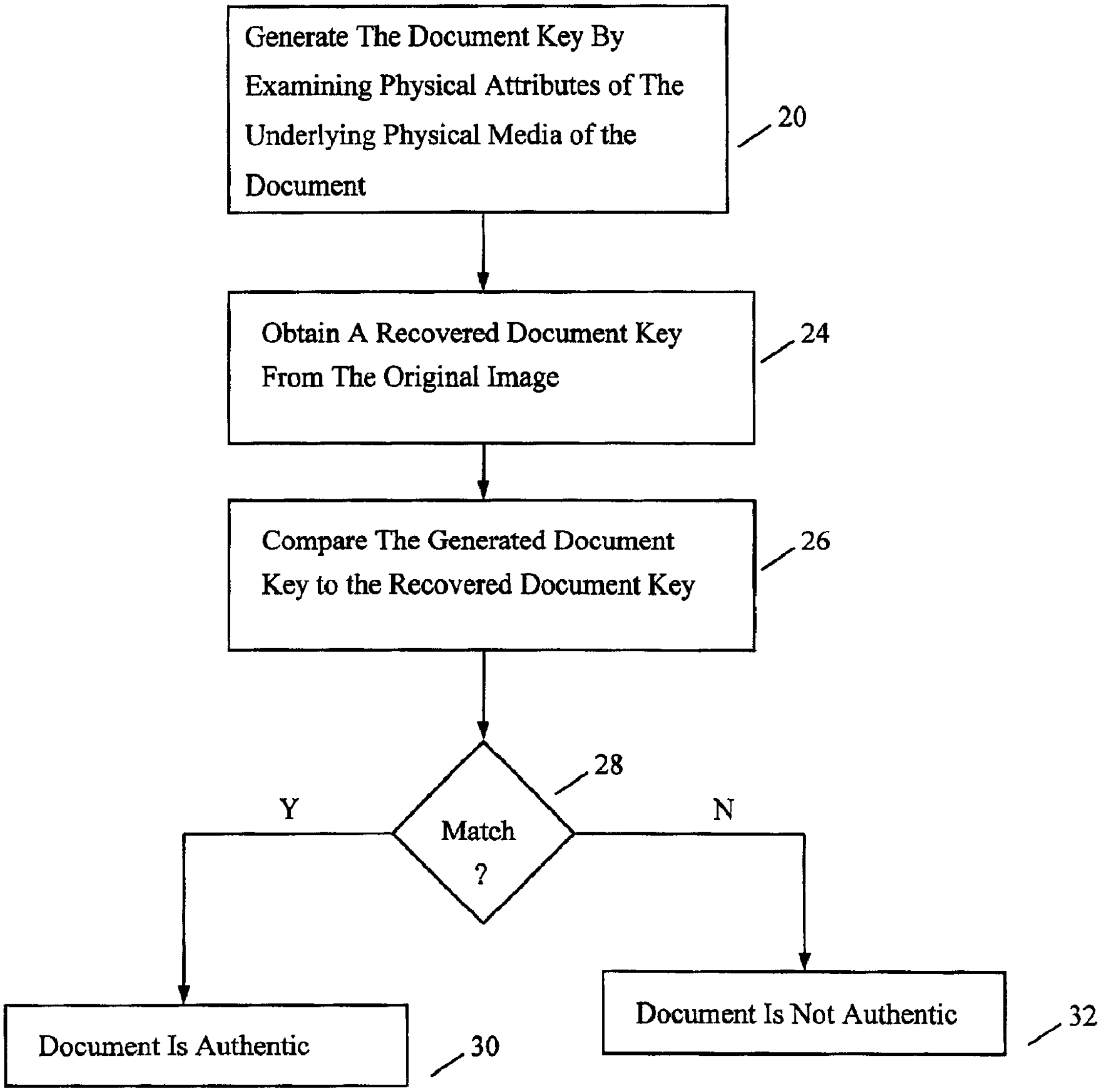
FIG. 3 shows a method for verifying a document according to the present techniques.

FIG. 3 shows a method for verifying a document according to the present techniques. At step 20, a document key for the document being verified is generated. The document key is based on the unique physical attributes of the physical media which underlies the document being verified. The document key is obtained at step 20 in a manner similar to that used in step 10, i.e. the same unique attributes are examined at step 20 when verifying a document as were examined at step 10 when authenticating the document.

At step 24, a recovered document key, the document key which was imparted onto the document at step 12, is recovered from the original image. The recovery of a document key at step 24 is essentially the reverse of the process used at step 12. For example, if the document key was incorporated into a digital signature which was encoded into the dithering patterns of an original image on the document, then at step 24 the digital signature is extracted from the dithering patterns of the same image on the document and the document key is recovered using the public key for the document. If the document key was printed on the physical media then at step 24 the document key is read from the document. If the digital signature was printed on the document then at step 24 the digital signature is read from the document being authenticated and the document key is recovered using the public key for the document. Alternatively, shared secret keys, i.e. symmetric keys, may be used.

At step 26, the recovered document key obtained at step 24 is compared to the document key generated at step 20. If the document keys match at step 28 then the document is verified as authentic at step 30. Otherwise, the document is not verified as authentic at step 32.

The private key secures the image to the underlying paper. This may be used to generate checks for originality. An authorized copy may be created where a new original/copy may be produced using the public key to decode the document key of the original. The watermark may then be removed and then a new watermark re-encoded using the new document key which is signed with the private key.

Figure 4:
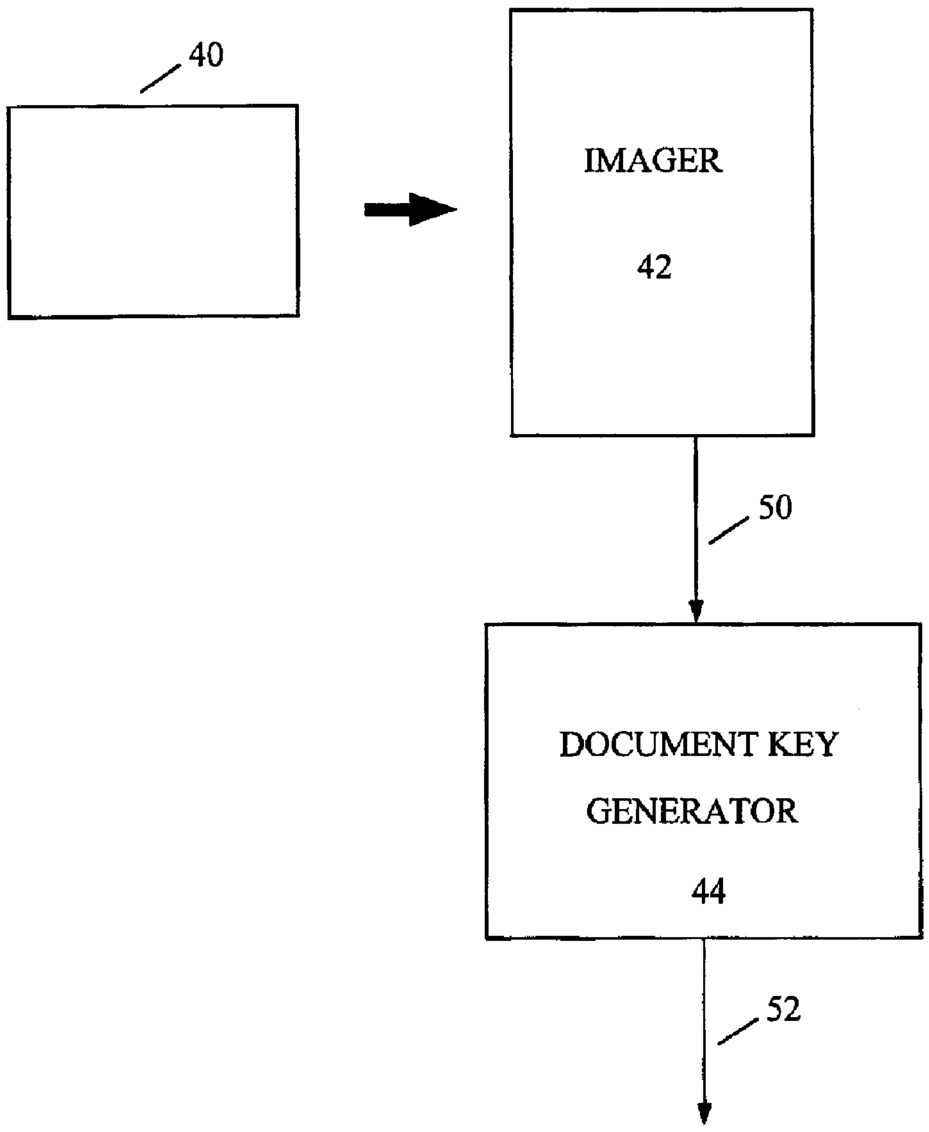
FIG. 4 shows one possible arrangement for generating a document Key for a document.

FIG. 4 shows one possible arrangement for generating a document key 52 for a document 40. This arrangement may be employed when authenticating the document 40 at step 10 and/or when verifying the document 40 at step 20. The document 40 is fed into an imager 42. The imager 42 generates a set of pixel values on an output 50. The pixel values on the output 50 are provided to a document key generator 44 which in response generates the document key 52 for the document 40.

The pixel resolution of the imager 42 is selected to enable detection of the unique physical attributes of the underlying paper of the document 40 upon which the document key 52 is based. In one embodiment, the imager 42 provides a pixel resolution of 2400 dots per inch which enables detection of the random differences in the density of the paper fibers that were formed during the manufacture of the paper that underlies the document 40.

In some embodiments, the document key generator 44 examines the pixel values in one or more predetermined areas of the document 40. There may be any number of these predetermined areas. The predetermined areas may be of any size and may be located anywhere on the document 40.

Figure 5:
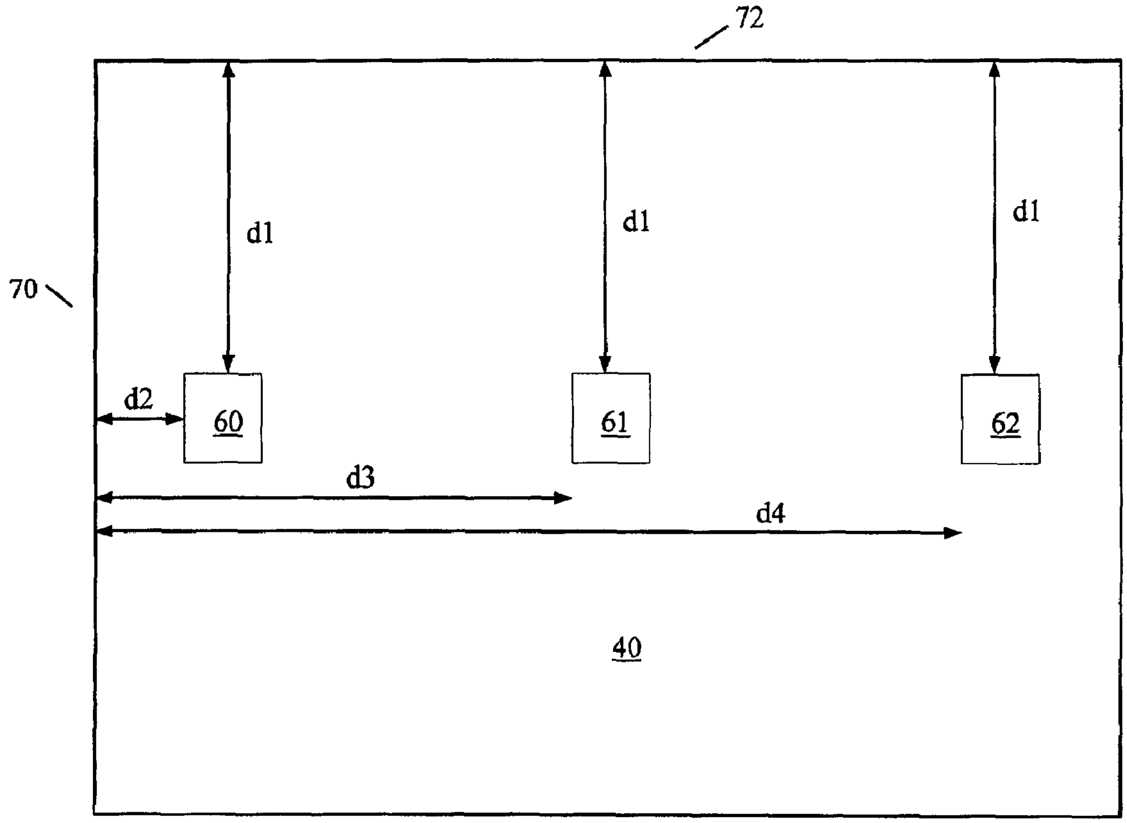
FIG. 5 shows one possible arrangement of predetermined areas of a document which are examined when generating a document key.

FIG. 5 shows one possible arrangement of predetermined areas 60–62 of the document 40 which are examined by the document key generator 44. In this embodiment, the predetermined areas 60–62 are referenced by distances from an edge 70 and an edge 72 of the document 40. For example, corresponding edges of the predetermined area 60 are a distance d2 and a distance d1 from the edges 70 and 72, respectively. Similarly, corresponding edges of the predetermined area 62 are a distance d4 and the distance d1 from the edges 70 and 72, respectively.

In some embodiments, a box may be used to delineate the area to be scanned. The box may be given orientation features (for example, directionality) to aid the reader in extracting the document key. Multiple boxes may be used for additional security and tolerance to document damage.

The document key generator 44 may use any encoding method for generating the document key 52. For example, the document key generator 44 may generate a checksum of the pixel values in each of the predetermined areas 60–62 and then determine an average of the checksums to yield the document key 52. As another example, the document key generator 44 may employ an MD5 encoding technique on the pixel values in the predetermined areas 60–62 to generate the document key 52.

In some embodiments, the document key 52 for the document 40 may be recorded in, for example, a data base along with information that describes what is originally printed on the document 40. Thereafter, the document 40 may be authenticated by obtaining its document key and performing a data base lookup using the document key to obtain the information that describes what was originally printed on the document 40. If something else is printed on the document 40 then it can be concluded that the original printing was stripped and replaced by a forger.

A flourescent or ultraviolet (uv) source of the appropriate wavelength may be used to with a uv sensor to detect a reflective substance or UV ink in the document 40. The uv ink or reflective substance is preferably imparted into the document 40 during manufacture of the underlying paper media so as to render it difficult and expensive for a forger to duplicate. The uv ink may be put into threads of the paper media. The reflective areas of the document 40 may be printed.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for facilitating the authentication of a document, comprising the steps of:

generating a document key by examining one or more physical attributes of a physical media that underlies the document; and encoding the document key with an element of an image printed on the physical media to produce an encoded document key, the encoded document key linking the unique physical attribute of the physical media to the image printed on the physical media.

2. The method of claim 1, comprising:

generating a digital signature using the document key and a private key that corresponds to the document; and employing the digital signature to encode the document key.

3. The method of claim 1, comprising printing the encoded document key on the physical media as at least a portion of the original image.

4. The method of claim 1, comprising recording the encoded document key along with a description of the document.

5. The method of claim 1, further comprising the step of verifying the document by performing the steps of:

generating the document key by examining the physical attributes of the physical media;

obtaining a recovered document key from the encoded document key;

comparing the document key to the recovered document key.

6. The method of claim 1, wherein the step of generating a document key comprises the step of examining a paper fiber pattern of the physical media.

7. The method of claim 6, wherein the step of examining the paper fiber pattern comprises the step of examining paper fiber patterns in each of a set of predetermined areas of the physical media.

8. The method of claim 1, comprising:

generating a digital signature using the document key and a shared secret key that corresponds to the document; and employing the digital signature to encode the document key.

9. The method of claim 1, wherein the physical media is paper.

10. The method of claim 1, wherein the step of generating a document key comprises the step of examining density differences of the physical media.

11. The method of claim 1, wherein the step of generating a document key comprises the step of examining a unique pattern imparted in the physical media.

12. The method of claim 11, wherein the step of examining a unique pattern comprises the step of examining a pattern of a reflective substance in the physical media.

13. The method of claim 11, wherein the step of examining a unique pattern comprises the step of examining a pattern of UV ink in the physical media.

14. The method of claim 11, wherein the step of examining a unique pattern comprises the step of examining a set of predetermined shapes printed in predetermined positions on the physical media.

15. The method of claim 14, further comprising the steps of measuring the predetermined positions and encoding the predetermined positions in the document key.

16. A method for facilitating validation of a physical document, comprising:

generating a document key based on a unique physical attribute of a physical media;

encoding the document key with an element of an image printed on the physical media to produce an encoded document key, the encoded document key linking the unique physical attribute of the physical media to the image printed on the physical media; and storing the encoded document key, the encoded document key being determinable from the physical media and the image printed on the physical media.

17. The method of claim 16, comprising printing the encoded document key on the physical media.

18. The method of claim 16, comprising:

generating a digital signature from the document key; and tying the document key to the physical media by encoding the digital signature and the element of the image.

19. The method of claim 16, comprising examining physical patterns in the physical media to determine the unique physical attribute.

20. The method of claim 16, comprising examining physical patterns in the physical media in predetermined areas on the physical media to determine the unique physical attribute.

21. The method of claim 16, comprising examining paper fiber patterns in the physical media to determine the unique physical attribute.

22. The method of claim 16, comprising measuring a location of the element of the image relative to the unique physical attribute and encoding the location with the document key to form the encoded document key.

23. A method for authenticating a physical document, comprising:

generating a document key based on a unique physical attribute of a physical media;

encoding the document key with an element of an image printed on the physical media to produce an encoded document key, the encoded document key linking the unique physical attribute of the physical media to the image printed on the physical media; and comparing the encoded document key with a previously stored encoded document key to determine whether the encoded document key and the previously stored encoded document key match to indicate that the physical document is authentic.

24. The method of claim 23, comprising retrieving the stored encoded document key from the physical document.

25. The method of claim 23, comprising generating a digital signature from the document key and tying the document key to the physical media by encoding the digital signature and the element of the image.

26. The method of claim 23, comprising examining physical patterns in the physical media to determine the unique physical attribute.

27. The method of claim 23, comprising examining physical patterns in the physical media in predetermined areas on the physical media to determine the unique physical attribute.

28. The method of claim 23, comprising examining paper fiber patterns in the physical media to determine the unique physical attribute.

29. The method of claim 23, comprising measuring a location of the element of the image relative to the unique physical attribute and encoding the location with the document key to form the encoded document key.

30. An apparatus for facilitating validation of a physical document, comprising:

a document key generator adapted to generate a document key based on a unique physical attribute of a physical media;

an encoder adapted to encode the document key with an element of an image printed on the physical media to produce an encoded document key, the encoded document key linking the unique physical attribute of the physical media to the image printed on the physical media; and storage media adapted to store the encoded document key, the encoded document key being determinable from the physical media and the image printed on the physical media.

31. The apparatus of claim 30, wherein the storage media is paper.

32. The apparatus of claim 30, wherein the encoder is adapted to generate a digital signature from the document key and tie the document key to the physical media by encoding the digital signature and the element of the image.

33. A system for facilitating validation of a physical document, comprising:

means for generating a document key based on a unique physical attribute of a physical media;

means for encoding the document key with an element of an image printed on the physical media to produce an encoded document key, the encoded document key linking the unique physical attribute of the physical media to the image printed on the physical media; and means for storing the encoded document key, the encoded document key being determinable from the physical media and the image printed on the physical media.

34. The system of claim 33, comprising means for measuring a location of the element of the image to the unique physical attribute and encoding the location with the document key to form the encoded document key.

35. The system of claim 33, comprising means for examining paper fiber patterns in the physical media to determine the unique physical attribute.

* * * * *